United States Patent
Takahashi et al.

(10) Patent No.: US 10,857,520 B2
(45) Date of Patent: Dec. 8, 2020

(54) EXHAUST GAS-PURIFYING THREE-WAY CATALYST AND METHOD FOR PRODUCING THE SAME, AND EXHAUST GAS-PURIFYING CATALYTIC CONVERTER

(71) Applicant: N.E. CHEMCAT CORPORATION, Mintao-ku (JP)

(72) Inventors: Yoshinori Takahashi, Minato-ku (JP); Akito Takayama, Minato-ku (JP); Hiroyuki Hara, Minato-ku (JP)

(73) Assignee: N.E. CHEMCAT CORPORATION, Minato-ku (JP)

( * ) Notice: Subject to any disclaimer, the term of this patent is extended or adjusted under 35 U.S.C. 154(b) by 0 days.

(21) Appl. No.: 16/347,274

(22) PCT Filed: Oct. 24, 2017

(86) PCT No.: PCT/JP2017/038372
§ 371 (c)(1),
(2) Date: May 3, 2019

(87) PCT Pub. No.: WO2018/088201
PCT Pub. Date: May 17, 2018

(65) Prior Publication Data
US 2019/0275500 A1 Sep. 12, 2019

(30) Foreign Application Priority Data

Nov. 11, 2016 (JP) .................................. 2016-220916
Dec. 26, 2016 (JP) .................................. 2016-250614

(51) Int. Cl.
*B01D 53/94* (2006.01)
*B01J 23/63* (2006.01)
(Continued)

(52) U.S. Cl.
CPC .............. *B01J 23/63* (2013.01); *B01D 53/94* (2013.01); *B01D 53/945* (2013.01); *B01J 35/10* (2013.01);
(Continued)

(58) Field of Classification Search
None
See application file for complete search history.

(56) References Cited

U.S. PATENT DOCUMENTS

| 9,561,494 B2 | 2/2017 | Kato et al. |
| 2009/0131249 A1 | 5/2009 | Takeshima et al. |

(Continued)

FOREIGN PATENT DOCUMENTS

| EP | 1 946 836 A1 | 7/2008 |
| EP | 2 075 063 A1 | 7/2009 |

(Continued)

OTHER PUBLICATIONS

Shiraishi et al. JP06154606A—translated document (Year: 1994).*
(Continued)

*Primary Examiner* — Jelitza M Perez
(74) *Attorney, Agent, or Firm* — Oblon, McClelland, Maier & Neustadt, L.L.P.

(57) ABSTRACT

An exhaust gas-purifying three-way catalyst containing: (i) base material particles of a Nd-solid dissolved zirconia-based complex oxide comprising Nd and Zr as constituent metal elements in the following mass proportions:

| $ZrO_2$ | 50 to 75% by mass; and |
| $Nd_2O_3$ | 25 to 50% by mass, | in terms of oxides; and (ii) Pd catalyst particles supported on the base material particles, wherein the Nd-solid dissolved (Continued)

zirconia-based complex oxide further contains at least one or more rare earth elements selected from the group consisting of yttrium, scandium, lanthanum, and praseodymium, as a constituent metal element, in an amount of a total of more than 0% by mass to 20% by mass or less in terms of an oxide.

9 Claims, 1 Drawing Sheet

(51) Int. Cl.
- *B01J 35/10* (2006.01)
- *B01J 37/02* (2006.01)
- *B01J 37/08* (2006.01)
- *B01J 37/18* (2006.01)
- *F01N 3/10* (2006.01)
- *F01N 3/28* (2006.01)

(52) U.S. Cl.
CPC ....... *B01J 35/1014* (2013.01); *B01J 37/0201* (2013.01); *B01J 37/08* (2013.01); *B01J 37/18* (2013.01); *F01N 3/10* (2013.01); *F01N 3/101* (2013.01); *F01N 3/2803* (2013.01); *B01D 2255/1023* (2013.01); *B01D 2255/908* (2013.01)

(56) References Cited

U.S. PATENT DOCUMENTS

| | | |
|---|---|---|
| 2009/0209408 A1 | 8/2009 | Kitamura et al. |
| 2012/0264587 A1 | 10/2012 | Schermanz et al. |
| 2013/0052108 A1 | 2/2013 | Ifrah et al. |
| 2014/0030158 A1 | 1/2014 | Takagi et al. |
| 2016/0279611 A1 | 9/2016 | Golden et al. |

FOREIGN PATENT DOCUMENTS

| | | | |
|---|---|---|---|
| EP | 2 301 662 A1 | | 3/2011 |
| JP | 6-154606 A | | 6/1994 |
| JP | 06154606 A | * | 6/1994 |
| JP | 9-313938 A | | 9/1997 |
| JP | 09313938 A | * | 12/1997 |
| JP | 2007-144393 A | | 6/2007 |
| JP | 2008-100152 A | | 5/2008 |
| JP | 2013-166130 A | | 8/2013 |
| WO | WO 2010/097307 A2 | | 9/2010 |
| WO | WO 2011/083157 A1 | | 7/2011 |
| WO | WO 2012/121085 A1 | | 9/2012 |
| WO | WO 2012/137930 A1 | | 10/2012 |

OTHER PUBLICATIONS

Hiramoto et al. JP09313938A—translated document (Year: 1997).*
International Search Report dated Jan. 30, 2018 in PCT/JP2017/038372 filed Oct. 24, 2017.

* cited by examiner

EXHAUST GAS-PURIFYING THREE-WAY CATALYST AND METHOD FOR PRODUCING THE SAME, AND EXHAUST GAS-PURIFYING CATALYTIC CONVERTER

TECHNICAL FIELD

The present invention relates to an exhaust gas-purifying catalyst in which Pd catalyst particles are supported on particular base material particles, and a method for producing the same, and an exhaust gas-purifying catalytic converter.

BACKGROUND ART

In the purification of hydrocarbon (HC), carbon monoxide (CO), and nitrogen oxide (NOx) discharged from the internal combustion engine of a car or the like, a Three-Way Catalyst (TWC) using as a catalytically active component a Platinum Group Metal (PGM) such as ruthenium, rhodium, palladium, osmium, iridium, or platinum is widely used. Conventionally, as the three-way catalyst, one having a support (base material particles) comprising a metal oxide such as alumina, zirconia, or ceria, and catalyst particles of Pt or the like supported on this support is widely known.

In this type of exhaust gas-purifying catalyst, the catalyst metal is supported on the support in the state of fine particles in order to decrease the amount of the relatively expensive PGM used and ensure high catalytic activity. However, a problem is that when the particles of the catalyst metal on the support are exposed to a high temperature environment, the particles sinter together for grain growth, and thus the catalytically active sites decrease significantly.

As a technique for suppressing such sintering of the catalyst metal, for example, Patent Literature 1 discloses an exhaust gas-purifying catalyst in which a mixture in which respective primary particles of $Al_2O_3$ particles and particles of a predetermined metal oxide are mixed on the nano-order is used as a support, and a platinum group metal is supported on this support. According to this technique, it is alleged that the primary particles of $Al_2O_3$ and the primary particles of the predetermined metal oxide are interposed between the particles, and therefore the progress of the grain growth of the primary particles of the single oxides is suppressed, and as a result, decreases in surface area and pore volume are sufficiently suppressed, and the dispersibility of the supported catalyst component can be sufficiently retained.

In addition, for example, Patent Literature 2 discloses an exhaust gas-purifying oxidation catalyst having a support comprising an AZT oxide or an AZ oxide, and a precious metal for catalyzing the oxidation of carbon monoxide supported on the support. According to this technique, it is alleged that atoms (ions) of a precious metal such as palladium or platinum are firmly fixed (supported) via oxygen atoms at base sites, that is, sites of atoms or atomic groups exhibiting basic properties, on the surface of the support comprising the AZT oxide or the AZ oxide, and therefore the sintering suppression effect is high, and the grain growth of the precious metal can be suppressed.

However, a problem is that the exhaust gas-purifying catalysts of Patent Literatures 1 and 2 are exhaust gas-purifying catalysts for diesel engines using $Al_2O_3$ as base material particles, and in internal combustion engine applications such as gasoline engines generating higher temperature exhaust gas, the heat resistance is insufficient, and the catalytic performance decreases rapidly.

On the other hand, as a three-way catalyst having improved heat resistance, Patent Literature 3 discloses an exhaust gas purification three-way catalyst comprising a $Zr_\alpha Pr_\beta Pd_\gamma O_{2-\delta}$ (wherein $\alpha+\beta+\gamma=1.000$, and $\delta$ is a value determined so as to satisfy charge neutral conditions) solid solution component in which the palladium content is in the range of 0.05 to 7% by weight, and the Pr/(Zr+Pr) atomic ratio is in the range of 0.05 to 0.6.

On the other hand, Patent Literatures 4 and 5 each disclose a ceria-zirconia-based metal oxide doped with a rare earth element such as yttrium, lanthanum, neodymium, praseodymium, and gadolinium, as a promoter having Oxygen Storage Capacity (OSC) (oxygen storage material).

CITATION LIST

Patent Literature

[Patent Literature 1] International Publication No. WO 2012/121085
[Patent Literature 2] International Publication No. WO 2012/137930
[Patent Literature 3] Japanese Patent Laid-Open No. 2013-166130
[Patent Literature 4] International Publication No. WO 2011/083157
[Patent Literature 5] International Publication No. WO 2010/097307

SUMMARY OF INVENTION

Technical Problem

However, the exhaust gas purification three-way catalyst described in Patent Literature 3 requires heat treatment in air at 800 to 1100° C. for as long as several tens of hours in order to obtain the solid solution having the special crystal structure, and is poor in productivity. In addition, Patent Literatures 4 and 5 only disclose ceria-zirconia-based metal oxides as oxygen storage materials.

The present invention has been made in view of the above problems. In other words, it is an object of the present invention to provide an exhaust gas-purifying three-way catalyst having a large palladium surface area and excellent in heat resistance and three-way purification performance, easy to produce, and also excellent in productivity, and a method for producing the same, an exhaust gas-purifying catalytic converter, and the like.

Solution to Problem

The present inventors have studied diligently in order to solve the above problems. As a result, the present inventors have found that the above problems can be solved by adopting a novel structure in which Pd catalyst particles are supported on particular base material particles, and completed the present invention.

Specifically, the present invention provides various specific modes shown below.

(1) An exhaust gas-purifying three-way catalyst comprising at least:

at least one selected from the group consisting of base material particles (A) of a Nd-solid dissolved zirconia-based complex oxide comprising Nd and Zr as constituent metal elements in the following mass proportions:

| ZrO$_2$ | 50 to 75% by mass; |
|---|---|
| Nd$_2$O$_3$ | 25 to 50% by mass, | in terms of oxides, and base material particles (B) of a La-solid dissolved zirconia-based complex oxide comprising La and Zr, and optionally Nd, as constituent metal elements in the following mass proportions:

| ZrO$_2$ | 50 to 80% by mass; |
|---|---|
| La$_2$O$_3$ | 20 to 50% by mass; |
| Nd$_2$O$_3$ | 0 to 20% by mass; | with a total amount of La$_2$O$_3$ and Nd$_2$O$_3$ being 20 to 50% by mass,
in terms of oxides; and
Pd catalyst particles supported on the at least one selected from the group consisting of the base material particles (A) and the base material particles (B).

(1A) An exhaust gas-purifying three-way catalyst comprising at least base material particles of a Nd-solid dissolved zirconia-based complex oxide comprising Nd and Zr as constituent metal elements in the following mass proportions: ZrO$_2$ 50 to 75% by mass; Nd$_2$O$_3$ 25 to 50% by mass, in terms of oxides; and Pd catalyst particles supported on the base material particles.

(2A) The exhaust gas-purifying three-way catalyst according to (1A), wherein the Pd catalyst particles are contained in an amount of 0.1 to 10% by mass in terms of metal palladium.

(3A) The exhaust gas-purifying three-way catalyst according to (1A) or (2A), wherein the Nd-solid dissolved zirconia-based complex oxide comprises at least one or more rare earth elements selected from the group consisting of yttrium, scandium, lanthanum, and praseodymium, as a constituent metal element, in an amount of a total of more than 0% by mass to 20% by mass or less in terms of an oxide.

(4A) The exhaust gas-purifying three-way catalyst according to any one of (1A) to (3A), wherein the Nd-solid dissolved zirconia-based complex oxide comprises La as a constituent metal element in the following mass proportion: La$_2$O$_3$ more than 0% by mass to 18% by mass or less, in terms of an oxide.

(5A) The exhaust gas-purifying three-way catalyst according to any one of (1A) to (4A), wherein the base material particles have an average particle diameter D$_{50}$ of 1 to 100 μm.

(6A) The exhaust gas-purifying three-way catalyst according to any one of (1A) to (5A), wherein a palladium surface area calculated by a carbon monoxide gas pulse adsorption method is 15 to 30 (m$^2$/Pd_g).

(7A) The exhaust gas-purifying three-way catalyst according to any one of (1A) to (6A), wherein a BET specific surface area is 10 to 50 m$^2$/g.

(8A) A method for producing an exhaust gas-purifying three-way catalyst, comprising at least steps of providing base material particles of a Nd-solid dissolved zirconia-based complex oxide comprising Nd and Zr as constituent metal elements in the following mass proportions: ZrO$_2$ 50 to 75% by mass; Nd$_2$O$_3$ 25 to 50% by mass, in terms of oxides; applying an aqueous solution containing at least Pd ions to a surface of the base material particles; and heat-treating or chemically treating the base material particles after treatment to support Pd catalyst particles on the surface of the base material particles.

(9A) An exhaust gas-purifying catalytic converter comprising at least a catalyst support, an oxygen storage layer provided on the catalyst support, and a catalyst layer provided on the oxygen storage layer, wherein the catalyst layer comprises the exhaust gas-purifying three-way catalyst according to any one of (1A) to (7A).

(1B) An exhaust gas-purifying three-way catalyst comprising at least base material particles of a La-solid dissolved zirconia-based complex oxide comprising La and Zr, and optionally Nd, as constituent metal elements in the following mass proportions: ZrO$_2$ 50 to 80% by mass; La$_2$O$_3$ 20 to 50% by mass; Nd$_2$O$_3$ 0 to 20% by mass; with a total amount of La$_2$O$_3$ and Nd$_2$O$_3$ being 20 to 50% by mass, in terms of oxides; and Pd catalyst particles supported on the base material particles.

(2B) The exhaust gas-purifying three-way catalyst according to (1B), wherein the Pd catalyst particles are contained in an amount of 0.1 to 10% by mass in terms of metal palladium.

(3B) The exhaust gas-purifying three-way catalyst according to (1B) or (2B), wherein the base material particles have an average particle diameter D$_{50}$ of 1 to 100 μm.

(4B) The exhaust gas-purifying three-way catalyst according to any one of (1B) to (3B), wherein a palladium surface area calculated by a carbon monoxide gas pulse adsorption method is 8 to 30 (m$^2$/Pd_g).

(5B) The exhaust gas-purifying three-way catalyst according to any one of (1B) to (4B), wherein a BET specific surface area is 10 to 50 (m$^2$/g).

(6B) A method for producing an exhaust gas-purifying three-way catalyst, comprising at least steps of providing base material particles of a La-solid dissolved zirconia-based complex oxide comprising La, Nd, and Zr as constituent metal elements in the following mass proportions: ZrO$_2$ 50 to 80% by mass; La$_2$O$_3$ 20 to 50% by mass; Nd$_2$O$_3$ 0 to 20% by mass; with a total amount of La$_2$O$_3$ and Nd$_2$O$_3$ being 20 to 50% by mass, in terms of oxides; applying an aqueous solution containing at least Pd ions to a surface of the base material particles; and heat-treating or chemically treating the base material particles after treatment to support Pd catalyst particles on the surface of the base material particles.

(7B) An exhaust gas-purifying catalytic converter comprising at least a catalyst support, an oxygen storage layer provided on the catalyst support, and a catalyst layer provided on the oxygen storage layer, wherein the catalyst layer comprises the exhaust gas-purifying three-way catalyst according to any one of (1B) to (5B).

A method for producing an exhaust gas-purifying three-way catalyst,
comprising at least steps of:
providing at least one selected from the group consisting of base material particles (A) of a Nd-solid dissolved zirconia-based complex oxide comprising Nd and Zr as constituent metal elements in the following mass proportions:

| ZrO$_2$ | 50 to 75% by mass; |
|---|---|
| Nd$_2$O$_3$ | 25 to 50% by mass; | in terms of oxides, and
base material particles (B) of a La-solid dissolved zirconia-based complex oxide comprising La and Zr, and optionally Nd, as constituent metal elements in the following mass proportions:

| | |
|---|---|
| ZrO$_2$ | 50 to 80% by mass; |
| La$_2$O$_3$ | 20 to 50% by mass; |
| Nd$_2$O$_3$ | 0 to 20% by mass; | with a total amount of La$_2$O$_3$ and Nd$_2$O$_3$ being 20 to 50% by mass,
in terms of oxides;
applying an aqueous solution containing at least Pd ions to a surface of the at least one selected from the group consisting of the base material particles (A) and the base material particles (B); and
heat-treating or chemically treating the base material particles after treatment to support Pd catalyst particles on the surface of the at least one selected from the group consisting of the base material particles (A) and the base material particles (B).

Advantageous Effects of Invention

According to the present invention, it is possible to realize an exhaust gas-purifying three-way catalyst having a large palladium surface area and excellent in heat resistance and three-way purification performance, easy to produce, and also excellent in productivity, and a method for producing the same, an exhaust gas-purifying catalytic converter, and the like. The exhaust gas-purifying catalyst of the present invention is catalyst particles having a composite structure in which many minute active sites (Pd catalyst particles) are supported on base material particles of a Nd-solid dissolved zirconia-based complex oxide or a La-solid dissolved zirconia-based complex oxide, and can be particularly preferably used as a Three Way Catalyst (TWC) for decreasing NOx, CO, HC, and the like in exhaust gas, based on the composition and structure. The exhaust gas-purifying catalyst and the like of the present invention can be mounted in directly-under-engine type (close-coupled) catalytic converters, tandem-arranged directly-under type (close-coupled) catalytic converters, and the like, and thus a decrease in canning cost, and the like can be promoted.

DESCRIPTION OF EMBODIMENTS

Figure 1:
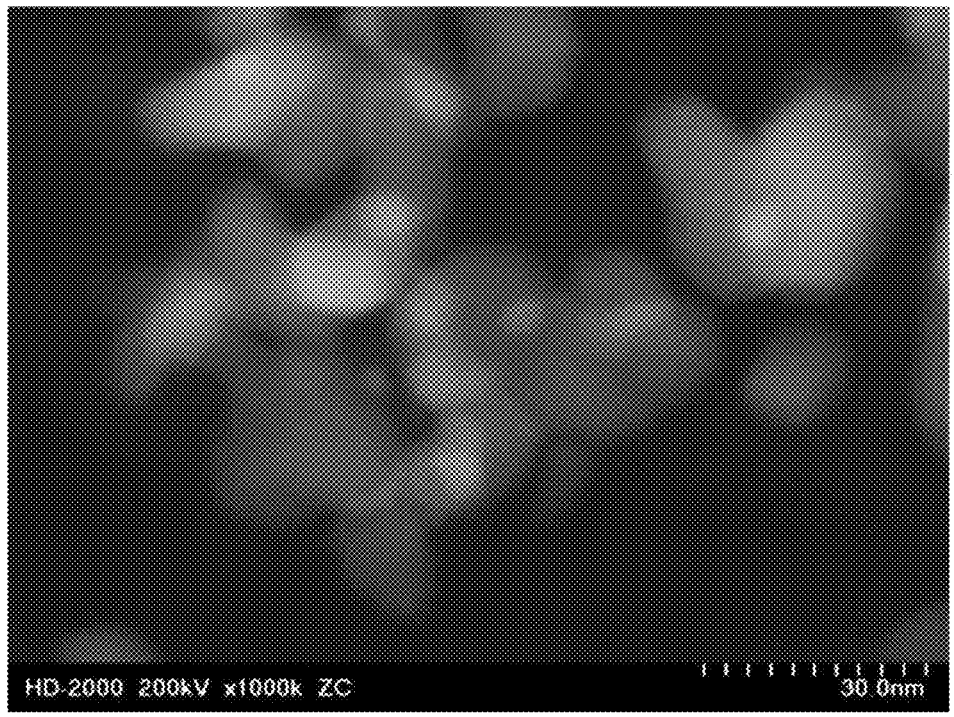
FIG. 1 is an STEM scattered electron image (ZC image) of the exhaust gas-purifying three-way catalyst (performance evaluation sample) of Example 7A.

Embodiments of the present invention will be described in detail below. The following embodiments are illustrations for explaining the present invention, and the present invention is not limited to these. As used herein, for example, the description of the numerical value range "1 to 100" includes both the upper limit value "1" and the lower limit value "100". The same applies to the description of other numerical value ranges.

A first exhaust gas-purifying three-way catalyst in this embodiment contains at least base material particles (A) of a Nd-solid dissolved zirconia-based complex oxide of a particular composition and Pd catalyst particles supported on these base material particles (A). This Nd-solid dissolved zirconia-based complex oxide contains at least neodymium (Nd), zirconium (Zr), and oxygen (O) as constituent elements and contains Nd and Zr in the following mass proportions in terms of oxides:
ZrO$_2$: 50 to 75% by mass
Nd$_2$O$_3$: 25 to 50% by mass.

By using the base material particles (A) of the Nd-solid dissolved zirconia-based complex oxide having such a composition, an exhaust gas-purifying three-way catalyst in which fine Pd catalyst particles are supported on the base material particles (A) in a highly dispersed state can be realized. Presumed action in the first exhaust gas-purifying three-way catalyst in this embodiment will be described below.

As previously described, it is known that in this type of catalyst, when exposed to a high temperature environment, the catalyst particles on the base material particles (A) sinter together for grain growth, and thus the catalytically active sites decrease significantly, and the catalytic performance decreases. In contrast to this, in the first exhaust gas-purifying three-way catalyst in this embodiment, when the external environment is switched from a reducing atmosphere to an oxidizing atmosphere, Nd contained in the base material particles (A) and the Pd catalyst particles form a complex oxide or solid solution, and further, when the external environment is switched from an oxidizing atmosphere to a reducing atmosphere, fine Pd catalyst particles are redispersed on the base material particles (A) from the complex oxide or solid solution. In other words, in the first exhaust gas-purifying three-way catalyst, the Pd catalyst particles are used, so to speak, as a PdO/Nd$_2$O$_3$ mixed oxide, and fine Pd catalyst particles are supported on the base material particles (A) in a highly dispersed state according to the change in the external environment. In addition, a zirconia-based complex oxide relatively excellent in heat resistance is used as the base material particles (A), and therefore the heat resistance of the catalyst itself is also enhanced. It is inferred that as a result of these in combination, an exhaust gas-purifying three-way catalyst excellent in heat resistance and three-way purification performance is realized. However, the action is not limited to these.

Since the first exhaust gas-purifying three-way catalyst in this embodiment is as described above, the above base material particles (A) and Pd catalyst particles should be confirmed at least in a reducing atmosphere, and the properties of the Pd catalyst particles in an oxidizing atmosphere and a stoichiometric atmosphere are not particularly limited. Here, as used herein, the reducing atmosphere means a state in which the exhaust gas-purifying three-way catalyst is allowed to stand under a hydrogen gas atmosphere at 400° C. for 0.5 hours or more. The Pd catalyst particles can be confirmed using, for example, a scanning transmission electron microscope (STEM) at a magnification of 1,000,000×, HD-2000 manufactured by Hitachi High-Technologies Corporation. The components will be described in detail below.

The mass proportion of Zr contained in the Nd-solid dissolved zirconia-based complex oxide is preferably 50 to 74% by mass, more preferably 50 to 70% by mass, and further preferably 50 to 65% by mass in terms of an oxide (ZrO$_2$). Zirconia is excellent in heat resistance and therefore suitable as the base material of an exhaust gas purification catalyst used under a high temperature environment. In addition, a zirconia-based complex oxide also has the merit of the formation of compounds of La and Nd for co-support being suppressed compared with alumina.

On the other hand, the mass proportion of Nd contained in the Nd-solid dissolved zirconia-based complex oxide is preferably 26 to 50% by mass, more preferably 30 to 50% by mass, and further preferably 35 to 50% by mass in terms of an oxide ($Nd_2O_3$). By using the zirconia-based complex oxide in which Nd, a rare earth element, is dissolved in this manner, the heat resistance of zirconia tends to improve, and the exhaust gas purification performance tends to be enhanced. In addition, the dispersibility of the supported Pd catalyst particles tends to be enhanced.

Here, the Nd-solid dissolved zirconia-based complex oxide may comprise another element in addition to the above-described constituent elements. For example, the Nd-solid dissolved zirconia-based complex oxide may comprise a rare earth element such as yttrium, cerium, scandium, lanthanum, praseodymium, promethium, samarium, europium, gadolinium, terbium, dysprosium, holmium, erbium, thulium, ytterbium, and lutetium as long as the effects of the present invention are not significantly impaired. One of these rare earth elements can be used alone, or two or more of these rare earth elements can be used in appropriate combination.

Among these, yttrium (Y), scandium (Sc), lanthanum (La), and praseodymium (Pr) can be used by replacing Nd with which the zirconia-based complex oxide is doped, and are preferred. At this time, the Nd-solid dissolved zirconia-based complex oxide preferably comprises yttrium, scandium, lanthanum, and praseodymium in an amount of more than 0% by mass to 18% by mass or less, more preferably more than 0% by mass to 15% by mass or less, and further preferably more than 0% by mass to 10% by mass or less in total in terms of oxides thereof.

Examples of one preferred mode include a Nd—La-solid dissolved zirconia-based complex oxide containing at least Nd, Zr, La, and O as constituent elements, containing Nd, Zr, and La in the following mass proportions in terms of oxides:
$ZrO_2$: 50 to 75% by mass
$Nd_2O_3$: 25 to 50% by mass
$La_2O_3$: more than 0% by mass to 18% by mass or less.

On the other hand, from the viewpoint of maintaining higher effects of the present invention, it is preferred that among the above-described rare earth elements, cerium, promethium, samarium, europium, gadolinium, terbium, dysprosium, holmium, erbium, thulium, ytterbium, and lutetium are not substantially contained in the Nd-solid dissolved zirconia-based complex oxide. Here, "does not substantially comprise" means that the mass proportions in terms of oxides thereof are 0 to 5% by mass based on the Nd-solid dissolved zirconia-based complex oxide, and the mass proportions are more preferably 0 to 3% by mass, further preferably 0 to 1% by mass.

The Nd-solid dissolved zirconia-based complex oxide may contain, as an unavoidable impurity, hafnium (Hf), which is usually contained in zirconia ore in an amount on the order of 1 to 2% by mass. Here, the total amount of unavoidable impurities excluding hafnium is preferably 0.3% by mass or less. In addition, in the Nd-solid dissolved zirconia-based complex oxide, part of zirconium may be replaced by an alkali metal element, an alkaline earth metal element, or the like in a range that does not significantly impair the effects of the present invention. Further, the Nd-solid dissolved zirconia-based complex oxide may contain a transition metal element such as iron (Fe), cobalt (Co), nickel (Ni), and copper (Cu) in a range that does not significantly impair the effects of the present invention.

A second exhaust gas-purifying three-way catalyst in this embodiment contains at least base material particles (B) of a La-solid dissolved zirconia-based complex oxide of a particular composition and Pd catalyst particles supported on these base material particles (B). This La-solid dissolved zirconia-based complex oxide contains at least lanthanum (La), zirconium (Zr), and oxygen (O) as constituent elements and contains La and Zr, and optionally Nd, in the following mass proportions in terms of oxides:
$ZrO_2$: 50 to 80% by mass
$La_2O_3$: 20 to 50% by mass
$Nd_2O_3$: 0 to 20% by mass
total amount of $La_2O_3$ and $Nd_2O_3$: 20 to 50% by mass.

By using the base material particles (B) of the La-solid dissolved zirconia-based complex oxide having such a composition, an exhaust gas-purifying three-way catalyst in which fine Pd catalyst particles are supported on the base material particles (B) in a highly dispersed state can be realized. Presumed action in the second exhaust gas-purifying three-way catalyst in this embodiment will be described below.

As previously described, it is known that in this type of catalyst, when exposed to a high temperature environment, the catalyst particles on the base material particles (B) sinter together for grain growth, and thus the catalytically active sites decrease significantly, and the catalytic performance decreases. In contrast to this, in the second exhaust gas-purifying three-way catalyst in this embodiment, when the external environment is switched from a reducing atmosphere to an oxidizing atmosphere, La (and optionally Nd) contained in the base material particles (B), and the Pd catalyst particles, form a complex oxide or solid solution, and further, when the external environment is switched from an oxidizing atmosphere to a reducing atmosphere, fine Pd catalyst particles are redispersed on the base material particles (B) from the complex oxide or solid solution. In other words, in the second exhaust gas-purifying three-way catalyst, the Pd catalyst particles are used, so to speak, as a $PdO/La_2O_3$ mixed oxide, and further used as a $PdO/Nd_2O_3$ mixed oxide when Nd is contained, and fine Pd catalyst particles are supported on the base material particles (B) in a highly dispersed state according to the change in the external environment. In addition, a zirconia-based complex oxide relatively excellent in heat resistance is used as the base material particles (B), and therefore the heat resistance of the catalyst itself is also enhanced. It is inferred that as a result of these in combination, an exhaust gas-purifying three-way catalyst excellent in heat resistance and three-way purification performance is realized. However, the action is not limited to these.

Since the second exhaust gas-purifying three-way catalyst in this embodiment is as described above, the above base material particles (B) and Pd catalyst particles should be confirmed at least in a reducing atmosphere, and the properties of the Pd catalyst particles in an oxidizing atmosphere and a stoichiometric atmosphere are not particularly limited. Here, as used herein, the reducing atmosphere means a state in which the exhaust gas-purifying three-way catalyst is allowed to stand under a hydrogen gas atmosphere at 400° C. for 0.5 hours or more. The Pd catalyst particles can be confirmed using, for example, a scanning transmission electron microscope (STEM) at a magnification of 1,000,000×, HD-2000 manufactured by Hitachi High-Technologies Corporation. The components will be described in detail below.

The mass proportion of Zr in the La-solid dissolved zirconia-based complex oxide is preferably 52 to 78% by mass, more preferably 55 to 76% by mass, and further preferably 55 to 75% by mass in terms of an oxide ($ZrO_2$). Zirconia is excellent in heat resistance and therefore suitable as the base material of an exhaust gas purification catalyst used under a high temperature environment. In addition, a zirconia-based complex oxide also has the merit of the formation of compounds of La and Nd for co-support being suppressed compared with alumina.

The mass proportion of La in the La-solid dissolved zirconia-based complex oxide is preferably 22 to 48% by mass, more preferably 24 to 45% by mass, and further preferably 25 to 45% by mass in terms of an oxide ($La_2O_3$). By using the zirconia-based complex oxide in which La, a rare earth element, is dissolved in this manner, the exhaust gas purification performance tends to be enhanced. In addition, the dispersibility of the supported Pd catalyst particles tends to be enhanced.

On the other hand, when the La-solid dissolved zirconia-based complex oxide comprises Nd (It is hereinafter also referred to as a "LaNd-solid dissolved zirconia-based complex oxide". When both a case where the La-solid dissolved zirconia-based complex oxide comprises Nd and a case where the La-solid dissolved zirconia-based complex oxide does not comprise Nd are intended, it is collectively referred to as a "La-solid dissolved zirconia-based complex oxide".), the mass proportion of Nd in the LaNd-solid dissolved zirconia-based complex oxide is preferably more than 0% by mass to 19% by mass or less, more preferably more than 0% by mass to 18% by mass or less, in terms of an oxide ($Nd_2O_3$). By using the zirconia-based complex oxide in which Nd, a rare earth element, is dissolved in this manner, the heat resistance of zirconia tends to improve, and the exhaust gas purification performance tends to be enhanced. In addition, the dispersibility of the supported Pd catalyst particles tends to be enhanced.

The total amount of La and Nd in the LaNd-solid dissolved zirconia-based complex oxide is preferably 22 to 48% by mass, more preferably 25 to 45% by mass, and further preferably 30 to 45% by mass in terms of oxides ($La_2O_3$ and $Nd_2O_3$). By using the zirconia-based complex oxide in which a predetermined amount of La and Nd, rare earth elements, are dissolved in this manner, the exhaust gas purification performance tends to be enhanced.

Here, the La-solid dissolved zirconia-based complex oxide may comprise another element in addition to the above-described constituent elements. For example, the La-solid dissolved zirconia-based complex oxide may comprise a rare earth element such as yttrium, cerium, scandium, praseodymium, promethium, samarium, europium, gadolinium, terbium, dysprosium, holmium, erbium, thulium, ytterbium, and lutetium as long as the effects of the present invention are not significantly impaired. One of these rare earth elements can be used alone, or two or more of these rare earth elements can be used in appropriate combination.

Among these, yttrium (Y), scandium (Sc), and praseodymium (Pr) can be used by replacing La and Nd with which the zirconia-based complex oxide is doped, and are preferred. At this time, the La-solid dissolved zirconia-based complex oxide preferably comprises yttrium, scandium, and praseodymium in an amount of more than 0% by mass to 10% by mass or less, more preferably more than 1% by mass to 8% by mass or less, and further preferably more than 2% by mass to 5% by mass or less in total in terms of oxides thereof.

On the other hand, from the viewpoint of maintaining higher effects of the present invention, it is preferred that among the above-described rare earth elements, cerium, promethium, samarium, europium, gadolinium, terbium, dysprosium, holmium, erbium, thulium, ytterbium, and lutetium are not substantially contained in the La-solid dissolved zirconia-based complex oxide. Here, "does not substantially comprise" means that the mass proportions in terms of oxides thereof are 0 to 5% by mass to the La-solid dissolved zirconia-based complex oxide, and the mass proportions are more preferably 0 to 3% by mass, further preferably 0 to 1% by mass.

The La-solid dissolved zirconia-based complex oxide may contain, as an unavoidable impurity, hafnium (Hf), which is usually contained in zirconia ore in an amount on the order of 1 to 2% by mass. Here, the total amount of unavoidable impurities excluding hafnium is preferably 0.3% by mass or less. In addition, in the La-solid dissolved zirconia-based complex oxide, part of zirconium may be replaced by an alkali metal element, an alkaline earth metal element, or the like in a range that does not significantly impair the effects of the present invention. Further, the La-solid dissolved zirconia-based complex oxide may contain a transition metal element such as iron (Fe), cobalt (Co), nickel (Ni), and copper (Cu) in a range that does not significantly impair the effects of the present invention.

The base material particles (A) and (B) of the Nd-solid dissolved zirconia-based complex oxide and the La-solid dissolved zirconia-based complex oxide of the particular compositions described above preferably have an average particle diameter $D_{50}$ of 1 to 100 µm, more preferably 1.5 to 60 µm, and further preferably 2 to 30 µm from the viewpoint of retaining a large specific surface area. As used herein, the average particle diameter $D_{50}$ means a median diameter measured by a laser diffraction particle size distribution measuring apparatus (for example, a laser diffraction particle size distribution measuring apparatus SALD-3100 manufactured by SHIMADZU CORPORATION).

For the base material particles, commercial products of various grades can be used. Both the base material particles (A) and (B) of the Nd-solid dissolved zirconia-based complex oxide and the La-solid dissolved zirconia-based complex oxide of the compositions described above can also be produced by methods known in the industry. The methods for producing the Nd-solid dissolved zirconia-based complex oxide and the La-solid dissolved zirconia-based complex oxide are not particularly limited, and coprecipitation methods and alkoxide methods are preferred.

As the coprecipitation method for the Nd-solid dissolved zirconia-based complex oxide, for example, a production method is preferred in which an alkali substance is added to an aqueous solution in which a zirconium salt and a neodymium salt, and a rare earth metal element blended as needed, are mixed at a predetermined stoichiometric ratio, to cause hydrolysis or coprecipitate a precursor, and the hydrolysis product or coprecipitate is fired. As the coprecipitation method for the La-solid dissolved zirconia-based complex oxide, for example, a production method is preferred, in which an alkali substance is added to an aqueous solution in which a zirconium salt and a lanthanum salt, and a neodymium salt and another rare earth metal element blended as needed, are mixed at a predetermined stoichiometric ratio, to cause hydrolysis or coprecipitate a precursor, and the hydrolysis product or coprecipitate is fired. The types of the various salts used here are not particularly limited. Generally, hydrochlorides, oxyhydrochlorides, nitrates, oxynitrates, carbonates, phosphates, acetates, oxalates, citrates, and the like are preferred. The type of the alkaline substance is not particularly limited either. Generally, an ammonia aqueous solution is preferred. As the alkoxide method for the Nd-solid dissolved zirconia-based complex oxide, for example, a production method is preferred, in which a mixture in which a zirconium alkoxide and a neodymium alkoxide, and a rare earth metal element blended as needed, are mixed at a predetermined stoichiometric ratio is hydrolyzed followed by firing. As the alkoxide method for the La-solid dissolved zirconia-based complex oxide, for example, a production method is preferred, in which a mixture in which a zirconium alkoxide and a lanthanum alkoxide, and a neodymium alkoxide and a rare earth metal element blended as needed, are mixed at a predetermined stoichiometric ratio is hydrolyzed followed by firing. The types of the alkoxides used here are not particularly limited. Generally, methoxides, ethoxides, propoxides, isopropoxides, butoxides, ethylene oxide adducts thereof, and the like are preferred. The rare earth metal element may be blended as a metal alkoxide or as the above-described various salts.

The firing conditions should follow an ordinary method and are not particularly limited. The firing atmosphere may be any of an oxidizing atmosphere, a reducing atmosphere, and an air atmosphere. The firing temperature and the treatment time fluctuate depending on the compositions of the Nd-solid dissolved zirconia-based complex oxide and the La-solid dissolved zirconia-based complex oxide and their stoichiometric ratios desired, and are generally preferably 150° C. to 1300° C. and 1 to 12 hours, more preferably 350° C. to 800° C. and 2 to 4 hours, from the viewpoint of productivity and the like. It is preferred to perform reduced pressure drying using a vacuum dryer or the like, and perform drying treatment at about 50° C. to 200° C. for on the order of about 1 to 48 hours, prior to high temperature firing.

The Pd catalyst particles supported on the base material particles (A) and/or (B) function as main catalytically active sites in the first or second exhaust gas-purifying three-way catalyst in this embodiment. These Pd catalyst particles can change to a complex oxide or a solid solution of PdO/$Nd_2O_3$, PdO, or metal Pd according to the external environment when the base material particles (A), the Nd-solid dissolved zirconia-based complex oxide, are used, as described above. The Pd catalyst particles can change to a complex oxide or a solid solution of PdO/$La_2O_3$, a PdO/$Nd_2O_3$ mixed oxide or solid solution in some cases, PdO, or metal Pd according to the external environment when the base material particles (B), the La-solid dissolved zirconia-based complex oxide, are used. Therefore, the oxidation state of the Pd catalyst particles is not particularly limited, but the Pd catalyst particles are preferably particles of PdO or metal Pd under a reducing atmosphere.

The content of the Pd catalyst particles supported on the base material particles (A) and/or (B) can be appropriately determined according to the desired performance and is not particularly limited but is preferably 0.1 to 10% by mass, more preferably 0.2 to 8% by mass, and further preferably 0.3 to 6% by mass in an amount in terms of metal palladium based on the total amount of the exhaust gas-purifying three-way catalyst from the viewpoint of improving catalytic performance throughout a lean environment to a stoichiometric environment to a rich environment, improving low temperature activity, and so on.

The Pd catalyst particles supported on the base material particles (A) and/or (B) preferably have an average crystallite diameter of 1 to 90 nm, more preferably 3 to 80 nm, from the viewpoint of maintaining many catalytically active sites to obtain high catalytic performance, and so on. The crystallite generally refers to the largest mass that can be regarded as a single crystal, and the size of the crystallite is referred to as a crystallite diameter. As used herein, the average crystallite diameter means a value obtained by measuring a diffraction pattern using an X-ray diffraction apparatus, and calculating from the Scherrer equation represented by the following formula (1), based on the measurement result.

$$\text{crystallite diameter } D\ (\text{Å}) = K \cdot \lambda / (\beta \cdot \cos \theta) \quad (1)$$

wherein K is the Scherrer constant, and K=0.9 is set here. $\lambda$ is the wavelength of the X-ray tube used, $\beta$ is the half-width, and $\theta$ is the diffraction angle (rad).

The exhaust gas-purifying three-way catalyst in this embodiment may contain a precious metal (PM) and a platinum group metal (PGM) other than Pd, but preferably does not substantially contain a precious metal (PM) or a platinum group metal (PGM) other than Pd considering use under high temperature conditions, and the like. Here, "does not substantially contain" means that the total amount of a precious metal (PM) and a platinum group metal (PGM) other than Pd is within the range of 0 to 1.0% by mass based on the total amount of the exhaust gas-purifying three-way catalyst, and the total amount is more preferably 0 to 0.5% by mass, further preferably 0 to 0.3% by mass.

The shape of the exhaust gas-purifying three-way catalyst in this embodiment is not particularly limited. For example, the exhaust gas-purifying three-way catalyst can be used in the state of a catalyst powder that is a collection of composite particles in which the Pd catalyst particles are supported on the base material particles (A) and/or (B). In addition, for example, the catalyst powder can be formed into any shape to provide a granular or pellet-like formed catalyst. In addition, this exhaust gas-purifying three-way catalyst can also be supported on a catalyst support. As the catalyst support used here, one known in the industry can be appropriately selected. Typical examples include, but are not particularly limited to, ceramic monolith supports made of cordierite, silicon carbide, silicon nitride, or the like, metal honeycomb supports made of stainless steel or the like, and wire mesh supports made of stainless steel or the like. One of these can be used alone, or two or more of these can be used in appropriate combination.

In addition, in the first exhaust gas-purifying three-way catalyst in this embodiment, the Metal Surface Area (MSA) per g of palladium, that is, the palladium surface area, calculated by a carbon monoxide gas pulse adsorption method is preferably 15 to 30 ($m^2$/Pd_g), more preferably 16 to 30 ($m^2$/Pd_g), and further preferably 17 to 30 ($m^2$/Pd_g) from the viewpoint of obtaining high catalytic performance, and so on.

Here, as used herein, the palladium surface area of the exhaust gas-purifying three-way catalyst means a value obtained by the conversion formula described in Examples described later, from the amount of CO adsorbed per unit mass of the catalyst (cc/g) measured using a gas adsorption measuring apparatus, for example, a metal dispersion measuring apparatus (trade name: BEL-METAL-3, manufactured by MicrotracBEL Corp.), using a sample obtained by subjecting to aging treatment (high temperature endurance treatment) the exhaust gas-purifying three-way catalyst to be measured. This aging treatment is performed for the purpose of promoting the stabilization of the running performance of the three-way catalyst. In this aging treatment, the exhaust gas-purifying three-way catalyst is subjected to heat treatment under an air atmosphere at a moisture concentration of 10% at 1050° C. for 12 hours and then subjected to reduction treatment under a hydrogen gas atmosphere at 400° C. for 0.5 hours.

In addition, in the second exhaust gas-purifying three-way catalyst in this embodiment, the Metal Surface Area (MSA) per g of palladium, that is, the palladium surface area, calculated by a carbon monoxide gas pulse adsorption method is preferably 8 to 30 ($m^2$/Pd_g), more preferably 10 to 30 ($m^2$/Pd_g), and further preferably 13 to 30 ($m^2$/Pd_g) from the viewpoint of obtaining high catalytic performance, and so on.

Further, in the exhaust gas-purifying three-way catalyst in this embodiment, the BET specific surface area according to a BET one-point method is preferably 10 to 50 m²/g, more preferably 12 to 50 m²/g, and further preferably 15 to 50 m²/g from the viewpoint of obtaining high catalytic performance, and so on. Here, as used herein, the BET specific surface area of the exhaust gas-purifying three-way catalyst is a value measured using a sample obtained by subjecting to the above-described aging treatment (high temperature endurance treatment) the exhaust gas-purifying three-way catalyst to be measured.

The above-described exhaust gas-purifying three-way catalyst is useful, for example, as the exhaust gas-purifying catalyst of an internal combustion engine, especially the exhaust gas-purifying catalyst of a gasoline car.

A method for producing an exhaust gas-purifying three-way catalyst is not particularly limited as long as one having a configuration in which Pd catalyst particles are supported on the base material particles (A) and/or (B) of the Nd-solid dissolved zirconia-based complex oxide and/or the La-solid dissolved zirconia-based complex oxide as described above is obtained. From the viewpoint of producing an exhaust gas-purifying three-way catalyst with good reproducibility, simply, and at low cost, an evaporation-to-dryness method (impregnation method) and the+ like are preferred.

As the evaporation-to-dryness method, a production method is preferred, in which the above-described base material particles (A) and/or (B) are impregnated with an aqueous solution containing at least Pd ions, and then heat-treated or chemically treated. The Pd ions are adsorbed (adhered) on the surfaces of the base material particles (A) and/or (B) in a highly dispersed state by this impregnation treatment. The Pd ions can be blended into the aqueous solution as various salts of palladium. The types of the various salts used here are not particularly limited. Generally, a hydrochloride, an oxyhydrochloride, a nitrate, an oxynitrate, a carbonate, a phosphate, an acetate, an oxalate, a citrate, and the like are preferred. The content of the Pd ions in the aqueous solution can be appropriately adjusted so that the desired content of Pd catalyst particles is obtained in the obtained exhaust gas-purifying three-way catalyst, and is not particularly limited. Needless to say, the aqueous solution used here may comprise the above-described optional components, for example, a rare earth element such as yttrium, scandium, or praseodymium, and a transition metal element, and further unavoidable impurities.

The conditions of the heat treatment and the chemical treatment should follow ordinary methods and are not particularly limited. For example, the atmosphere during the heat treatment may be any of an oxidizing atmosphere, an air atmosphere, and a reducing atmosphere. The heat treatment temperature and time fluctuate depending on the compositions of the Nd-solid dissolved zirconia-based complex oxide and the La-solid dissolved zirconia-based complex oxide and their stoichiometric ratios desired, and are generally preferably 500 to 1100° C. and 0.1 to 12 hours, more preferably 550° C. to 800° C. and 0.5 to 6 hours, from the viewpoint of the formation of Pd catalyst particles, productivity, and the like. It is possible to perform reduced pressure drying using a vacuum dryer or the like, and perform drying treatment at about 50° C. to 200° C. for on the order of about 1 to 48 hours, prior to the heat treatment. As the chemical treatment, the Pd ions may be hydrolyzed on the support surface using a basic component, after the impregnation treatment in the above evaporation-to-dryness method. For the basic component used here, amines such as ammonia and ethanolamine, alkali metal hydroxides such as caustic soda and strontium hydroxide, and alkaline earth metal hydroxides such as hydroxide barium are preferred. Pd catalyst particles highly dispersed in a nano-order size are formed on the surfaces of the base material particles (A) and/or (B) by the heat treatment and chemical treatment.

During the making of a formed catalyst, various known dispersing apparatuses, kneading apparatuses, and forming apparatuses can be used. When the exhaust gas-purifying three-way catalyst is retained on a catalyst support, various known coating methods, wash coating methods, or zone coating methods can be applied.

The exhaust gas-purifying three-way catalyst in this embodiment can be used by being blended into the catalyst layer of an exhaust gas-purifying catalytic converter. For example, it can be carried out by providing a catalyst layer containing the exhaust gas-purifying three-way catalyst in this embodiment on a catalyst support such as the ceramic monolith support described above. The catalyst area of the exhaust gas-purifying catalytic converter may be any of a single layer of only one catalyst layer, a laminate comprising two or more catalyst layers, and a laminate combining one or more catalyst layers, and one or more other layers known in the industry. For example, in the case of a multilayer configuration in which the exhaust gas-purifying catalytic converter has at least an oxygen storage layer and a catalyst layer on a catalyst support, the exhaust gas-purifying catalytic converter excellent in heat resistance and three-way purification performance can be provided by at least containing the exhaust gas-purifying three-way catalyst in this embodiment in the catalyst layer. Considering the trend of the tightening of exhaust gas regulation, for the layer configuration, two or more layers are preferred.

The method for forming the catalyst layer should be performed according to an ordinary method and is not particularly limited. As one example, it is possible to mix the exhaust gas-purifying three-way catalyst in this embodiment and an aqueous medium, and a binder, another catalyst, promoter particles, an OSC material, base material particles other than the above-described base material particles (A) and (B), an additive, and the like known in the industry, as needed, in the desired blending proportion to prepare a slurry-like mixture, and apply the obtained slurry-like mixture to the surface of a catalyst support followed by drying and firing. At this time, it is possible to blend an acid or a base for pH adjustment and blend a surfactant, a dispersing resin, or the like for the adjustment of viscosity or slurry dispersibility improvement, as needed. As the method for mixing the slurry, grinding and mixing by a ball mill or the like can be applied, but another grinding or mixing method can also be applied.

The method for applying the slurry-like mixture to the catalyst support should be performed according to an ordinary method and is not particularly limited. Various known coating methods, wash coating methods, or zone coating methods can be applied. After the application of the slurry-like mixture, by performing drying and firing according to ordinary methods, a catalyst layer containing the exhaust gas-purifying three-way catalyst in this embodiment can be obtained. An apparatus incorporating the exhaust gas-purifying three-way catalyst in this embodiment in this manner can be used as a catalytic converter.

The above-described exhaust gas-purifying catalytic converter can be arranged in the exhaust systems of various engines. The number of exhaust gas-purifying catalytic converters installed and the place where the exhaust gas-purifying catalytic converter is installed can be appropriately designed according to the regulation of exhaust gas. For example, when the regulation of exhaust gas is strict, the number of installation places is two or more, and for the installation places, an exhaust gas-purifying catalytic converter can be arranged at an underfloor position at the rear of a directly-under (close-coupled) catalyst in an exhaust system.

According to a catalyst composition and an exhaust gas-purifying catalytic converter containing the exhaust gas-purifying three-way catalyst in this embodiment, an effect excellent in a CO, HC, and NOx purification reaction can be exhibited in various running specifications including not only those during starting at low temperature but those during high speed running at high temperature.

EXAMPLES

The features of the present invention will be more specifically described below by giving Test Examples, Examples, and Comparative Examples, but the present invention is not limited in any way by these. In other words, the materials, amounts used, proportions, treatment details, treatment procedures, and the like shown in the following Examples can be appropriately changed without departing from the spirit of the present invention.

<Measurement of Palladium Surface Area>

First, the amount of CO adsorbed, M, (cc/g) on each performance evaluation sample specimen was measured by a carbon monoxide gas pulse adsorption method. The Pd surface area per amount of CO adsorbed in a simple ideal model (3517.487 $m^2$/mmol) was used as a coefficient W. The palladium surface area ($m^2$/Pd_g) was calculated from the amount of CO adsorbed, M, and the coefficient W, and the volume of an ideal gas in a standard state (22.4 L/mol) based on the following formula (2).

$$\text{palladium surface area (m}^2\text{/g\_Pd)}=W*M/22.4 \quad (2)$$

The coefficient W used at this time was calculated based on the amount of CO adsorbed on alumina particles on which 1% by mass of Pd was supported (palladium average crystallite diameter: 45.4 nm, density: 12.023 g/cc, surface area 10.99215 $m^2$/g) measured by the carbon monoxide gas pulse adsorption method (0.07 cc/g).

In the measurement of the amount of CO adsorbed, M, by the carbon monoxide gas pulse adsorption method, using a metal dispersion measuring apparatus (trade name: BEL-METAL-3, manufactured by MicrotracBEL Corp.), under conditions in which the performance evaluation sample specimen was reduced under a hydrogen atmosphere at 400° C., then purged with helium gas, and cooled to 25° C., a 10% CO gas pulse was injected per minute until no CO adsorption was seen, to calculate the amount of CO adsorbed on the performance evaluation sample specimen. In the measurement of the palladium surface areas of exhaust gas-purifying three-way catalysts, 1.0 g of a sample subjected to heat treatment under an air atmosphere at a moisture concentration of 10% at 1050° C. for 12 hours was used for all.

<Measurement of BET Specific Surface Area>

The BET specific surface area was obtained by a BET one-point method using a specific surface area/pore distribution measuring apparatus (trade name: BELSORP-mini II, manufactured by MicrotracBEL Corp.) and analysis software (trade name: BEL Master, manufactured by MicrotracBEL Corp.). In the measurement of the BET specific surface areas of exhaust gas-purifying three-way catalysts, 0.1 g of a sample subjected to heat treatment under an air atmosphere at a moisture concentration of 10% at 1050° C. for 12 hours was used for all.

Example 1A

As base material particles, Nd-solid dissolved zirconia-based complex oxide ($Nd_2O_3$: 26% by mass, $ZrO_2$: 74% by mass, $D_{50}$=3.1 μm, BET specific surface area: 46 $m^2$/g) was used. Next, a palladium(II) nitrate solution (containing 20% by mass in terms of PdO) was prepared, and the above Nd-solid dissolved zirconia-based complex oxide was impregnated with the palladium(II) nitrate solution and fired at 600° C. for 30 minutes to obtain the powder catalyst of Example 1A (exhaust gas-purifying three-way catalyst, amount supported in terms of Pd: 1.0% by mass).

Then, the obtained powder catalyst was allowed to stand in a furnace, subjected to heat treatment under an air atmosphere at a moisture concentration of 10% at 1050° C. for 12 hours, and then subjected to reduction treatment under a hydrogen gas atmosphere at 400° C. for 0.5 hours to obtain the performance evaluation sample (exhaust gas-purifying three-way catalyst) of Example 1A.

When the exhaust gas-purifying three-way catalyst powder sample was observed using a scanning transmission electron microscope (STEM) at a magnification of 1,000,000×, it was confirmed that fine Pd catalyst particles were supported on the base material particles having an average particle diameter $D_{50}$ of 1 to 100 μm.

Example 2A

Except that a Nd-solid dissolved zirconia-based complex oxide ($Nd_2O_3$: 35% by mass, $ZrO_2$: 65% by mass, $D_{50}$=3.9 μm, BET specific surface area: 60 $m^2$/g) was used instead of the Nd-solid dissolved zirconia-based complex oxide used in Example 1A, the same operation as in Example 1A was performed to obtain the powder catalyst (exhaust gas-purifying three-way catalyst, amount supported in terms of Pd: 1.0% by mass) and performance evaluation sample of Example 2A.

Example 3A

Except that a Nd-solid dissolved zirconia-based complex oxide ($Nd_2O_3$: 43% by mass, $ZrO_2$: 57% by mass, $D_{50}$=2.0 μm, BET specific surface area: 57 $m^2$/g) was used instead of the Nd-solid dissolved zirconia-based complex oxide used in Example 1A, the same operation as in Example 1A was performed to obtain the powder catalyst (exhaust gas-purifying three-way catalyst, amount supported in terms of Pd: 1.0% by mass) and performance evaluation sample of Example 3A.

Example 4A

Except that a Nd-solid dissolved zirconia-based complex oxide ($Nd_2O_3$: 50% by mass, $ZrO_2$: 50% by mass, $D_{50}$=2.0 μm, BET specific surface area: 53 $m^2$/g) was used instead of the Nd-solid dissolved zirconia-based complex oxide used in Example 1A, the same operation as in Example 1A was performed to obtain the powder catalyst (exhaust gas-purifying three-way catalyst, amount supported in terms of Pd: 1.0% by mass) and performance evaluation sample of Example 4A.

Example 5A

Except that a Nd—La-solid dissolved zirconia-based complex oxide ($Nd_2O_3$: 26% by mass, $La_2O_3$: 8% by mass, $ZrO_2$: 66% by mass, $D_{50}$=2.0 μm, BET specific surface area: 59 $m^2$/g) was used instead of the Nd-solid dissolved zirconia-based complex oxide used in Example 1A, the same operation as in Example 1A was performed to obtain the powder catalyst (exhaust gas-purifying three-way catalyst, amount supported in terms of Pd: 1.0% by mass) and performance evaluation sample of Example 5A.

Example 6A

Except that a Nd—La-solid dissolved zirconia-based complex oxide ($Nd_2O_3$: 26% by mass, $La_2O_3$: 15% by mass, $ZrO_2$: 59% by mass, $D_{50}$=2.5 µm, BET specific surface area: 65 m²/g) was used instead of the Nd-solid dissolved zirconia-based complex oxide used in Example 1A, the same operation as in Example 1A was performed to obtain the powder catalyst (exhaust gas-purifying three-way catalyst, amount supported in terms of Pd: 1.0% by mass) and performance evaluation sample of Example 6A.

Example 7A

Except that a Nd—La-solid dissolved zirconia-based complex oxide ($Nd_2O_3$: 35% by mass, $La_2O_3$: 15% by mass, $ZrO_2$: 50% by mass, $D_{50}$=2.1 µm, BET specific surface area: 51 m²/g) was used instead of the Nd-solid dissolved zirconia-based complex oxide used in Example 1A, the same operation as in Example 1A was performed to obtain the powder catalyst (exhaust gas-purifying three-way catalyst, amount supported in terms of Pd: 1.0% by mass) and performance evaluation sample of Example 7A.

Example 8A

Except that a Nd—La-solid dissolved zirconia-based complex oxide ($Nd_2O_3$: 43% by mass, $La_2O_3$: 3% by mass, $ZrO_2$: 54% by mass, $D_{50}$=1.9 µm, BET specific surface area: 62 m²/g) was used instead of the Nd-solid dissolved zirconia-based complex oxide used in Example 1A, the same operation as in Example 1A was performed to obtain the powder catalyst (exhaust gas-purifying three-way catalyst, amount supported in terms of Pd: 1.0% by mass) and performance evaluation sample of Example 8A.

Comparative Example 1A

Except that a zirconia-based oxide ($ZrO_2$: 100% by mass, $D_{50}$=0.1 µm, BET specific surface area: 25 m²/g) was used instead of the Nd-solid dissolved zirconia-based complex oxide used in Example 1A, the same operation as in Example 1A was performed to obtain the powder catalyst (exhaust gas-purifying three-way catalyst, amount supported in terms of Pd: 1.0% by mass) and performance evaluation sample of Comparative Example 1A.

Comparative Example 2A

Except that a Nd-solid dissolved zirconia-based complex oxide ($Nd_2O_3$: 9% by mass, $ZrO_2$: 91% by mass, $D_{50}$=2.5 µm, BET specific surface area: 65 m²/g) was used instead of the Nd-solid dissolved zirconia-based complex oxide used in Example 1A, the same operation as in Example 1A was performed to obtain the powder catalyst (exhaust gas-purifying three-way catalyst, amount supported in terms of Pd: 1.0% by mass) and performance evaluation sample of Comparative Example 2A.

Comparative Example 3A

Except that a Nd-solid dissolved zirconia-based complex oxide ($Nd_2O_3$: 18% by mass, $ZrO_2$: 82% by mass, $D_{50}$=2.8 µm, BET specific surface area: 64 m²/g) was used instead of the Nd-solid dissolved zirconia-based complex oxide used in Example 1A, the same operation as in Example 1A was performed to obtain the exhaust gas-purifying three-way catalyst (amount supported in terms of Pd: 1.0% by mass) and performance evaluation sample of Comparative Example 3A.

Comparative Example 4A

Except that a Nd-solid dissolved zirconia-based complex oxide ($Nd_2O_3$: 75% by mass, $ZrO_2$: 25% by mass, $D_{50}$=2.5 µm, BET specific surface area: 25 m²/g) was used instead of the Nd-solid dissolved zirconia-based complex oxide used in Example 1A, the same operation as in Example 1A was performed to obtain the exhaust gas-purifying three-way catalyst (amount supported in terms of Pd: 1.0% by mass) and performance evaluation sample of Comparative Example 4A.

For the performance evaluation samples of Examples 1A to 8A and Comparative Examples 1A to 4A obtained, the measurement of the palladium surface area and the measurement of the BET specific surface area were each performed. The measurement results are shown in Table 1. An STEM photograph of the exhaust gas-purifying three-way catalyst (performance evaluation sample) of Example 7A is shown in FIG. 1.

TABLE 1

| | Nd-solid dissolved zirconia-based complex oxide | | | Pd (111) crystallite | Amount of CO absorbed | Pd surface area | BET specific surface area |
|---|---|---|---|---|---|---|---|
| | $Nd_2O_3$ % by mass | $La_2O_3$ % by mass | $ZrO_2$ % by mass | diameter nm | cc/g | m²/Pd_g | m²/g |
| Example 1A | 26 | — | 74 | 57.5 | 0.11 | 17.3 | 24 |
| Example 2A | 35 | — | 65 | 61.7 | 0.12 | 18.8 | 20 |
| Example 3A | 43 | — | 57 | 74.2 | 0.15 | 23.6 | 18 |
| Example 4A | 50 | — | 50 | 65.1 | 0.11 | 17.3 | 16 |
| Example 5A | 26 | 8 | 66 | 71.7 | 0.10 | 15.7 | 21 |
| Example 6A | 26 | 15 | 59 | 67.7 | 0.11 | 17.3 | 20 |
| Example 7A | 35 | 15 | 50 | 67.7 | 0.11 | 17.3 | 16 |
| Example 8A | 43 | 3 | 54 | 73.7 | 0.13 | 20.4 | 16 |
| Comparative Example 1A | — | — | 100 | 56.4 | 0.04 | 6.3 | 3 |
| Comparative Example 2A | 9 | — | 91 | 60.4 | 0.07 | 11.0 | 24 |
| Comparative Example 3A | 18 | — | 82 | 53.2 | 0.09 | 14.1 | 27 |
| Comparative Example 4A | 75 | — | 25 | — | 0.02 | 3.1 | 10 |

As is clear from Table 1, it was confirmed that the exhaust gas-purifying three-way catalysts of Examples 1A to 8A corresponding to the present invention had a large palladium surface area relative to the exhaust gas-purifying three-way catalysts of Comparative Examples 1A to 4A. In addition, it was also shown that the BET specific surface area tended to decrease as the amount of the rare earth element dissolved increased. On the other hand, a clear correlation between the palladium surface area and the BET specific surface area could not be confirmed. From these, it was shown that the number of catalytically active sites in the exhaust gas-purifying three-way catalyst was not necessarily proportional to the BET specific surface area, and it was confirmed that it was possible to realize an exhaust gas-purifying three-way catalyst having a large palladium surface area and excellent in catalytic performance though having a relatively small BET specific surface area.

<Laboratory Measurement of HC and NO Purification Performance>

Next, for the above performance evaluation samples, HC purification performance and NO purification performance were each evaluated. Here, 50 mg of each performance evaluation sample subjected to heat treatment under an air atmosphere at 800° C. for 20 hours in a furnace was weighed, placed in a sample holder, and subjected to a purification performance test in a steady gas flow of a model gas at 300° C. using a TPD reactor (thermal desorption gas analyzer, trade name: BEL Mass, manufactured by MicrotracBEL Corp.).

The model gas composition used here is shown in Table 2.

TABLE 2

| Flow rate Components | 300 mL/min |
| --- | --- |
| CO | 0.3% |
| $C_3H_6$ | 330 ppm |
| NO | 0.2% |
| $O_2$ | 0.2% |
| He | Remainder |

The HC purification rate and the NO purification rate were calculated based on the following formulas (2) and (3).

HC purification rate (%)=100−(HC-MASS peak intensity (during measurement)/HC-MASS peak intensity (Blank))×100   (2)

NO purification rate (%)=100−(NO-MASS peak intensity (during measurement)/NO-MASS peak intensity (Blank))×100   (3)

The measurement results of the HC and NO purification performance are shown in Table 3.

TABLE 3

| | Nd-solid dissolved zirconia-based complex oxide | | | Purification performance | |
| --- | --- | --- | --- | --- | --- |
| | $Nd_2O_3$ % by mass | $La_2O_3$ % by mass | $ZrO_2$ % by mass | HC conversion rate (%) | NO conversion rate (%) |
| Example 1A | 26 | — | 74 | 62 | 53 |
| Example 2A | 35 | — | 65 | 74 | 67 |
| Example 3A | 43 | — | 57 | 78 | 79 |
| Example 4A | 50 | — | 50 | 71 | 66 |
| Example 6A | 26 | 15 | 59 | 69 | 60 |
| Example 8A | 43 | 3 | 54 | 78 | 67 |
| Comparative Example 1A | — | — | 100 | 39 | 21 |
| Comparative Example 3A | 18 | — | 82 | 55 | 43 |

As is clear from Table 3, it was confirmed that the exhaust gas-purifying three-way catalysts of the Examples corresponding to the present invention achieved both a HC purification rate of 50% or more and a NO purification rate of 50% or more and were excellent in catalytic performance compared with the exhaust gas-purifying three-way catalysts of the Comparative Examples.

Example 1B

As base material particles, La-solid dissolved zirconia-based complex oxide ($La_2O_3$: 23% by mass, $ZrO_2$: 77% by mass, $D_{50}$=2.7 μm, BET specific surface area: 70 m²/g) was used. Next, a palladium(II) nitrate solution (containing 20% by mass in terms of PdO) was prepared, and the above La-solid dissolved zirconia-based complex oxide was impregnated with the palladium(II) nitrate solution and fired at 600° C. for 30 minutes to obtain the powder catalyst of Example 1B (exhaust gas-purifying three-way catalyst, amount supported in terms of Pd: 1.0% by mass).

Then, the obtained powder catalyst was allowed to stand in a furnace, subjected to heat treatment under an air atmosphere at a moisture concentration of 10% at 1050° C. for 12 hours, and then subjected to reduction treatment under a hydrogen gas atmosphere at 400° C. for 0.5 hours to obtain the performance evaluation sample (exhaust gas-purifying three-way catalyst) of Example 1B.

When the exhaust gas-purifying three-way catalyst powder sample was observed using a scanning transmission electron microscope (STEM) at a magnification of 1,000,000×, it was confirmed that fine Pd catalyst particles were supported on the base material particles having an average particle diameter $D_{50}$ of 1 to 100 μm.

Example 2B

Except that a La-solid dissolved zirconia-based complex oxide ($La_2O_3$: 30% by mass, $ZrO_2$: 70% by mass, $D_{50}$=3.1 μm, BET specific surface area: 60 m²/g) was used instead of the La-solid dissolved zirconia-based complex oxide used in Example 1B, the same operation as in Example 1B was performed to obtain the powder catalyst (exhaust gas-purifying three-way catalyst, amount supported in terms of Pd: 1.0% by mass) and performance evaluation sample of Example 2B.

Example 3B

Except that a La-solid dissolved zirconia-based complex oxide ($La_2O_3$: 40% by mass, $ZrO_2$: 60% by mass, $D_{50}$=2.7 μm, BET specific surface area: 55 m²/g) was used instead of the La-solid dissolved zirconia-based complex oxide used in Example 1B, the same operation as in Example 1B was performed to obtain the powder catalyst (exhaust gas-purifying three-way catalyst, amount supported in terms of Pd: 1.0% by mass) and performance evaluation sample of Example 3B.

Example 4B

Except that a La-solid dissolved zirconia-based complex oxide ($La_2O_3$: 50% by mass, $ZrO_2$: 50% by mass, $D_{50}$=1.8 µm, BET specific surface area: 41 m$^2$/g) was used instead of the La-solid dissolved zirconia-based complex oxide used in Example 1B, the same operation as in Example 1B was performed to obtain the powder catalyst (exhaust gas-purifying three-way catalyst, amount supported in terms of Pd: 1.0% by mass) and performance evaluation sample of Example 4B.

Example 5B

Except that a LaNd-solid dissolved zirconia-based complex oxide ($La_2O_3$: 23% by mass, $Nd_2O_3$: 18% by mass, $ZrO_2$: 59% by mass, $D_{50}$=2.5 µm, BET specific surface area: 51 m$^2$/g) was used instead of the La-solid dissolved zirconia-based complex oxide used in Example 1B, the same operation as in Example 1B was performed to obtain the powder catalyst (exhaust gas-purifying three-way catalyst, amount supported in terms of Pd: 1.0% by mass) and performance evaluation sample of Example 5B.

Example 6B

Except that a LaNd-solid dissolved zirconia-based complex oxide ($La_2O_3$: 30% by mass, $Nd_2O_3$: 9% by mass, $ZrO_2$: 61% by mass, $D_{50}$=2.5 µm, BET specific surface area: 55 m$^2$/g) was used instead of the La-solid dissolved zirconia-based complex oxide used in Example 1B, the same operation as in Example 1B was performed to obtain the powder catalyst (exhaust gas-purifying three-way catalyst, amount supported in terms of Pd: 1.0% by mass) and performance evaluation sample of Example 6B.

Comparative Example 1B

Except that a zirconia-based oxide ($ZrO_2$: 100% by mass, $D_{50}$=0.1 µm, BET specific surface area: 25 m$^2$/g) was used instead of the La-solid dissolved zirconia-based complex oxide used in Example 1B, the same operation as in Example 1B was performed to obtain the powder catalyst (exhaust gas-purifying three-way catalyst, amount supported in terms of Pd: 1.0% by mass) and performance evaluation sample of Comparative Example 1B.

Comparative Example 2B

Except that a La-solid dissolved zirconia-based complex oxide ($La_2O_3$: 3% by mass, $ZrO_2$: 97% by mass, $D_{50}$=1.1 µm, BET specific surface area: 51 m$^2$/g) was used instead of the La-solid dissolved zirconia-based complex oxide used in Example 1B, the same operation as in Example 1B was performed to obtain the powder catalyst (exhaust gas-purifying three-way catalyst, amount supported in terms of Pd: 1.0% by mass) and performance evaluation sample of Comparative Example 2B.

Comparative Example 3B

Except that a La-solid dissolved zirconia-based complex oxide ($La_2O_3$: 8% by mass, $ZrO_2$: 92% by mass, $D_{50}$=2.6 µm, BET specific surface area: 71 m$^2$/g) was used instead of the La-solid dissolved zirconia-based complex oxide used in Example 1B, the same operation as in Example 1B was performed to obtain the exhaust gas-purifying three-way catalyst (amount supported in terms of Pd: 1.0% by mass) and performance evaluation sample of Comparative Example 3B.

Comparative Example 4B

Except that a La-solid dissolved zirconia-based complex oxide ($La_2O_3$: 15% by mass, $ZrO_2$: 85% by mass, $D_{50}$=3.3 µm, BET specific surface area: 67 m$^2$/g) was used instead of the La-solid dissolved zirconia-based complex oxide used in Example 1B, the same operation as in Example 1B was performed to obtain the exhaust gas-purifying three-way catalyst (amount supported in terms of Pd: 1.0% by mass) and performance evaluation sample of Comparative Example 4B.

Comparative Example 5B

Except that a La-solid dissolved zirconia-based complex oxide ($La_2O_3$: 75% by mass, $ZrO_2$: 25% by mass, $D_{50}$=3.5 µm, BET specific surface area: 27 m$^2$/g) was used instead of the La-solid dissolved zirconia-based complex oxide used in Example 1B, the same operation as in Example 1B was performed to obtain the exhaust gas-purifying three-way catalyst (amount supported in terms of Pd: 1.0% by mass) and performance evaluation sample of Comparative Example 5B.

Figure 2:
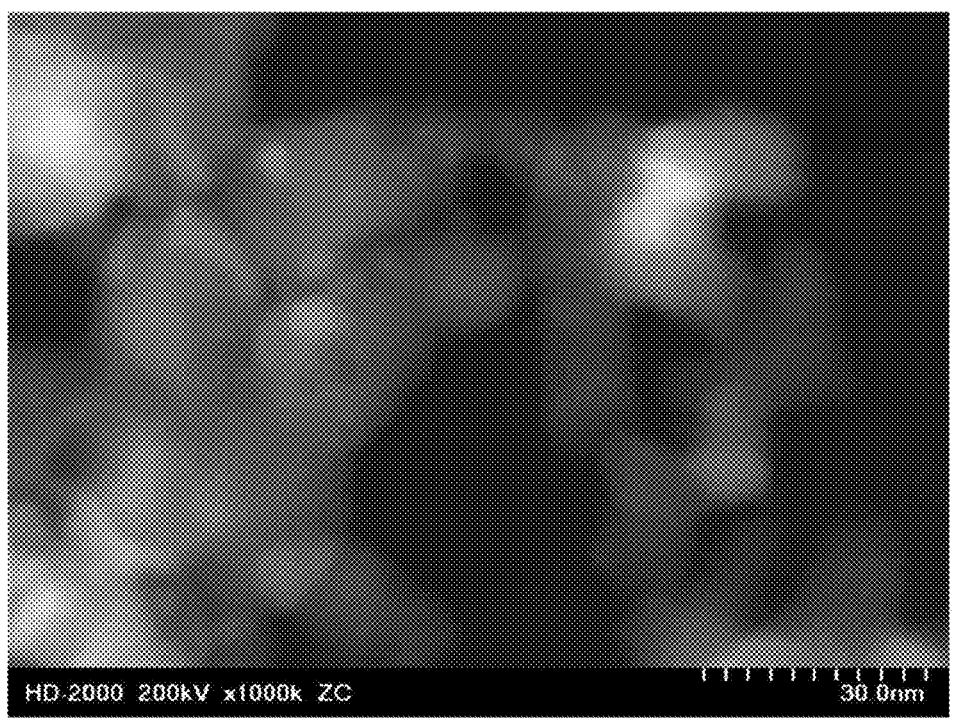
FIG. 2 is an STEM scattered electron image (ZC image) of the exhaust gas-purifying three-way catalyst (performance evaluation sample) of Example 6B.

For the performance evaluation samples of Examples 1B to 6B and Comparative Examples 1B to 5B obtained, the measurement of the palladium surface area and the measurement of the BET specific surface area were each performed. The measurement results are shown in Table 4. An STEM photograph of the exhaust gas-purifying three-way catalyst (performance evaluation sample) of Example 6B is shown in FIG. 2.

TABLE 4

| | La-solid dissolved zirconia-based complex oxide | | | Pd (111) crystallite diameter nm | Amount of CO adsorbed cc/g | Pd surface area m$^2$/Pd_g | BET specific surface area m$^2$/g |
|---|---|---|---|---|---|---|---|
| | $La_2O_3$ % by mass | $Nd_2O_3$ % by mass | $ZrO_2$ % by mass | | | | |
| Example 1B | 23 | — | 77 | 56.4 | 0.08 | 12.6 | 22 |
| Example 2B | 30 | — | 70 | 76.9 | 0.1 | 15.7 | 20 |
| Example 3B | 40 | — | 60 | 61.3 | 0.11 | 17.3 | 16 |
| Example 4B | 50 | — | 50 | 67.1 | 0.06 | 9.4 | 10 |
| Example 5B | 23 | 18 | 59 | 55.3 | 0.12 | 18.8 | 21 |
| Example 6B | 30 | 9 | 61 | 67.1 | 0.09 | 14.1 | 17 |

TABLE 4-continued

| | La-solid dissolved zirconia-based complex oxide | | | Pd (111) crystallite diameter nm | Amount of CO adsorbed cc/g | Pd surface area $m^2/Pd\_g$ | BET specific surface area $m^2/g$ |
|---|---|---|---|---|---|---|---|
| | $La_2O_3$ % by mass | $Nd_2O_3$ % by mass | $ZrO_2$ % by mass | | | | |
| Comparative Example 1B | — | — | 100 | 56.4 | 0.04 | 6.3 | 3 |
| Comparative Example 2B | 3 | — | 97 | 52.9 | 0.04 | 6.3 | 12 |
| Comparative Example 3B | 8 | — | 92 | 53.9 | 0.04 | 6.3 | 18 |
| Comparative Example 4B | 15 | — | 85 | 58.7 | 0.05 | 7.9 | 17 |
| Comparative Example 5B | 75 | — | 25 | — | 0.03 | 4.7 | 10 |

As is clear from Table 4, it was confirmed that the exhaust gas-purifying three-way catalysts of Examples 1B to 6B corresponding to the present invention had a large palladium surface area relative to the exhaust gas-purifying three-way catalysts of Comparative Examples 1B to 5B. In addition, it was also shown that the BET specific surface area tended to decrease as the amount of the rare earth element dissolved increased. On the other hand, a clear correlation between the palladium surface area and the BET specific surface area could not be confirmed. From these, it was shown that the number of catalytically active sites in the exhaust gas-purifying three-way catalyst was not necessarily proportional to the BET specific surface area, and it was confirmed that it was possible to realize an exhaust gas-purifying three-way catalyst having a large palladium surface area and excellent in catalytic performance though having a relatively small BET specific surface area.

<Laboratory Measurement of HC and NO Purification Performance>

Next, for the above performance evaluation samples, HC purification performance and NO purification performance were each evaluated. Here, 50 mg of each performance evaluation sample subjected to heat treatment under an air atmosphere at 800° C. for 20 hours in a furnace was weighed, placed in a sample holder, and subjected to a purification performance test in a steady gas flow of a model gas at 300° C. using a TPD reactor (thermal desorption gas analyzer, trade name: BEL Mass, manufactured by MicrotracBEL Corp.).

The model gas composition used here is shown in Table 5.

TABLE 5

| Flow rate Components | 300 mL/min |
|---|---|
| CO | 0.3% |
| $C_3H_6$ | 330 ppm |
| NO | 0.2% |
| $O_2$ | 0.2% |
| He | Remainder |

The HC purification rate and the NO purification rate were calculated based on the following formulas (3) and (4).

HC purification rate (%)=100−(HC-MASS peak intensity (during measurement)/HC-MASS peak intensity (Blank))×100  (3)

NO purification rate (%)=100−(NO-MASS peak intensity (during measurement)/NO-MASS peak intensity (Blank))×100  (4)

The measurement results of the HC and NO purification performance are shown in Table 6.

TABLE 6

| | La-solid dissolved zirconia-based complex oxide | | | Purification performance | |
|---|---|---|---|---|---|
| | | | | HC | NO |
| | $La_2O_3$ % by mass | $Nd_2O_3$ % by mass | $ZrO_2$ % by mass | conversion rate (%) | conversion rate (%) |
| Example 1B | 23 | — | 77 | 57 | 45 |
| Example 3B | 40 | — | 60 | 84 | 73 |
| Example 4B | 50 | — | 50 | 55 | 42 |
| Example 5B | 23 | 18 | 59 | 75 | 64 |
| Example 6B | 30 | 9 | 61 | 80 | 65 |
| Comparative Example 1B | — | — | 100 | 39 | 21 |
| Comparative Example 4B | 15 | — | 85 | 48 | 35 |
| Comparative Example 5B | 75 | — | 25 | 24 | 22 |

As is clear from Table 6, it was confirmed that the exhaust gas-purifying three-way catalysts of the Examples corresponding to the present invention achieved both a HC purification rate of 50% or more and a. NO purification rate of 40% or more and were excellent in catalytic performance compared with the exhaust gas-purifying three-way catalysts of the Comparative Examples.

INDUSTRIAL APPLICABILITY

The exhaust gas-purifying three-way catalyst and exhaust gas-purifying catalytic converter of the present invention can be widely and effectively utilized as a three-way catalyst for decreasing NOx, CO, HC, and the like in exhaust gas and can be especially effectively utilized in gasoline engine applications where more heat resistance is required than in diesel engines. In addition, the exhaust gas-purifying three-way catalyst of the present invention can be effectively utilized as the TWC of a directly-under-engine type (close-coupled) catalytic converter, a tandem-arranged directly-under type (close-coupled) catalytic converter, or the like.

The invention claimed is:

1. An exhaust gas-purifying three-way catalyst comprising:
    (i) base material particles (A) of a Nd-solid dissolved zirconia-based complex oxide comprising Nd and Zr as constituent metal elements in the following mass proportions:

| | |
|---|---|
| $ZrO_2$ | 50 to 59% by mass; and |
| $Nd_2O_3$ | 35 to 50% by mass, | in terms of oxides; and (ii) Pd catalyst particles supported on the base material particles (A), wherein the Nd-solid dissolved zirconia-based complex oxide further comprises at least one or more rare earth elements selected from the group consisting of yttrium, scandium, lanthanum, and praseodymium, as a constituent metal element, in an amount of a total of more than 0% by mass to 20% by mass or less in terms of an oxide.

2. The exhaust gas-purifying three-way catalyst of claim 1, comprising the Pd catalyst particles in an amount of 0.1 to 10% by mass in terms of metal palladium.

3. The exhaust gas-purifying three-way catalyst of claim 1, wherein the Nd-solid dissolved zirconia-based complex oxide comprises La as a constituent metal element in the following mass proportion:

$La_2O_3$ more than 0% by mass to 18% by mass or less, in terms of an oxide.

4. The exhaust gas-purifying three-way catalyst of claim 1, wherein the base material particles (A) have an average particle diameter $D_{50}$ of 1 to 100 μm.

5. The exhaust gas-purifying three-way catalyst of claim 1, wherein a palladium surface area calculated by a carbon monoxide gas pulse adsorption method is 8 to 30 ($m^2$/Pd_g).

6. The exhaust gas-purifying three-way catalyst of claim 5, wherein the palladium surface area calculated by the carbon monoxide gas pulse adsorption method is 15 to 30 ($m^2$/Pd_g).

7. The exhaust gas-purifying three-way catalyst of claim 1, wherein a BET specific surface area is 10 to 50 ($m^2$/g).

8. A method for producing an exhaust gas-purifying three-way catalyst, the method comprising:

(i) providing base material particles (A) of a Nd-solid dissolved zirconia-based complex oxide comprising Nd and Zr as constituent metal elements in the following mass proportions:

| | |
|---|---|
| $ZrO_2$ | 50 to 59% by mass; and |
| $Nd_2O_3$ | 35 to 50% by mass, | in terms of oxides;

(ii) applying an aqueous solution comprising at least Pd ions to a surface of the base material particles (A); and (iii) heat-treating or chemically treating the base material particles after the applying to support Pd catalyst particles on the surface of the base material particles (A).

9. An exhaust gas-purifying catalytic converter comprising:

a catalyst support, an oxygen storage layer provided on the catalyst support, and a catalyst layer provided on the oxygen storage layer, wherein the catalyst layer comprises the exhaust gas-purifying three-way catalyst of claim 1.

* * * * *